United States Patent [19]
Kinsley, Jr.

[11] 3,920,428
[45] Nov. 18, 1975

[54] FILTER ELEMENT
[75] Inventor: Homan B. Kinsley, Jr., Richmond, Va.
[73] Assignee: Ethyl Corporation, Richmond, Va.
[22] Filed: Mar. 25, 1974
[21] Appl. No.: 454,375

[52] U.S. Cl. ........ 55/528; 55/DIG. 16; 55/DIG. 30; 60/311
[51] Int. Cl.² ........................................ B01D 39/16
[58] Field of Search ...... 55/524, 527, 528, DIG. 16, 55/DIG. 30; 210/505; 161/150, 170; 60/311

[56] References Cited
UNITED STATES PATENTS

| | | | |
|---|---|---|---|
| 2,336,797 | 12/1943 | Maxwell | 161/150 |
| 2,826,265 | 3/1958 | DeWoody | 55/522 |
| 3,316,904 | 5/1967 | Wall et al. | 55/522 |
| 3,815,338 | 6/1974 | Lenane | 55/528 |

FOREIGN PATENTS OR APPLICATIONS

| | | |
|---|---|---|
| 871,581 | 6/1961 | United Kingdom |
| 877,885 | 9/1961 | United Kingdom |

OTHER PUBLICATIONS
Lee et al. – New Linear Polymers McGraw Hill dta 4/15/68 pages 131–138, 166–169.

*Primary Examiner*—Bernard Nozick
*Attorney, Agent, or Firm*—Donald L. Johnson; Robert A. Linn; Joseph D. Odenweller

[57] ABSTRACT

A strong flexible filter element adapted to remove particulates from the exhaust gas of internal combustion engines comprising a non-woven mat of glass fibers fused with aromatic polyamide fibers, e.g., poly(m-phenylene isophthalamide) fibers.

7 Claims, 3 Drawing Figures

FILTER ELEMENT

BACKGROUND

Much effort has been placed in recent years on removal of particulates from exhaust gas of internal combustion engines. These particles are formed during combustion of the fuel and contain carbonaceous materials and other combustion products derived from additives conventionally used in such fuels, such as those resulting from the combustion of tetraethyl lead antiknocks. A variety of means have been employed to remove these particulates, such as the use of cyclone traps (cf. U.S. Pat. Nos. 3,056,662; 3,132,473; 3,154,389; 3,162,518; 3,197,955; 3,253,400; 3,426,513; 3,564,843; and 3,397,043) and the use of filters (cf. U.S. Pat. No. 3,421,315; 3,100,146; and 3,154,389).

SUMMARY OF THE INVENTION

According to the present invention a filter element is provided that has exceptional strength and flex properties making it ideally suited for use at high temperatures such as encountered in an exhaust system of an internal combustion engine.

The filter element comprises a non-woven mat of glass fibers and aromatic polyamide fibers in which the aromatic polyamide fiber is fused to the glass fiber. By "fused" is meant that it adheres to the glass fiber by having been heated while in contact with the glass fiber. Aromatic polyamides are sometimes referred to as non-fusible, but it has now been found that by some mechanism they do tenaciously adhere and bind glass fibers when heated to very high temperatures in contact with glass fiber.

DESCRIPTION OF THE PREFERRED EMBODIMENTS

Figure 1:
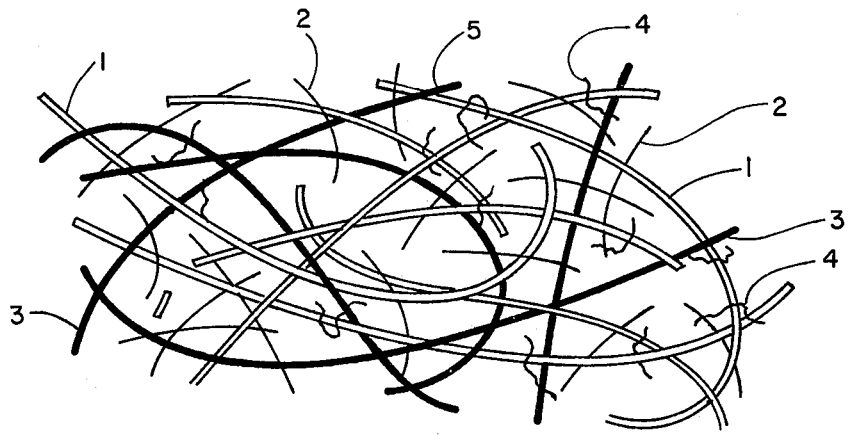
FIG. 1 is a plan view of a portion of a non-woven fiber mat of this invention.

A preferred embodiment of the invention is a filter element of high strength and good flex useful in filtration of particulates from gas at elevated temperatures, said filter element comprising a non-woven mat of glass fibers and aromatic polyamide fibers, said aromatic polyamide fibers being fused to said glass fibers.

Aromatic polyamides are described in U.S. Pat. No. 3,094,511 and British Pat. No. 1,106,190, incorporated herein by reference. The preferred aromatic polyamide fibers are those having a softening temperature above about 350°C. Examples of such fibers include:
poly(4,4'-diphenylene terephthalamide)
poly(3,3'-dimethyl-4,4'-diphenylene terephthalamide)
poly(ethylene terephthalamide)
poly(4,4'-methylenediphenylene terephthalamide)
poly(4,4'-diphenylene isophthalamide)
poly(4,4'-methylenediphenylene isophthalamide)
poly(trimethylene terephthalamide)
poly(m-phenylene isophthalamide)
poly(ethylene-N,N'-dimethylterephthalamide)
poly(3,3'-dimethyl-4,4'-methylenediphenylene terephthalamide)
poly(p-xylene terephthalamide)
poly(3,3'-dimethyl-4,4'-diphenylene isophthalamide)

The most preferred aromatic polyamide fiber is poly(m-phenylene isophthalamide), which is a commercially available fiber ("Nomex," Reg. trademark, E. I. du Pont Company).

The ratio of glass fiber to aromatic polyamide fiber can vary widely. A useful range is from about 30–95 weight percent glass fiber and from about 5–70 weight percent aromatic polyamide fiber.

The aromatic polyamide fiber can have about any conventional fiber diameter and length. The preferred aromatic polyamide fibers used in making the filter element are those conventionally used to make synthetic papers. The most preferred aromatic polyamide fibers are mixtures of fibrids and short fibers as described in U.S. Pat. No. 3,756,908, incorporated fully herein by reference. These short fibers are referred to as "floc" and comprise fibers less than one inch in length, and generally about 0.25 inch in length. The fibrids are small non-granular, non-rigid, fibrous or film-like particles. Two of their three dimensions are on the order of microns. Their smallness and suppleness allows them to be deposited in physically entwined configurations within the fiber mat. These fibers are referred to as "non-fusible" but it has been found that when heated in contact with a glass fiber they soften and deform around the glass fiber and thereby become firmly bonded to it.

Instead of preparing the mixture of fibrids and short fibers they can be conveniently obtained by merely disintegrating a synthetic aromatic polyamide paper made according to U.S. Pat. No. 3,756,908. Such synthetic papers are commercially available. One such highly preferred source of poly(m-phenylene isophthalamide) fibrids and short fibers is "Nomex" paper, a synthetic paper made according to U.S. Pat. No. 3,756,908 by E. I. du Pont Company. The synthetic paper is disintegrated by placing it in a high shear blender with water converting it to an aqueous slurry. The glass fibers can be added to the same slurry and the resultant furnish used to make the non-woven mat of this invention.

The glass fibers can have any diameter from about 0.5–15 microns and lengths from about ¼ to 3 inches. In one preferred embodiment the glass fibers are a mixture of glass macro fibers having a diameter of about 6–10 microns and glass micro fibers having a diameter of about 1–3 microns. The macro fiber can be of any length up to about 3 inches or more, while the micro fibers are preferably less than one inch, and more preferably less than ¼ inch long. For example, good results are obtained using micro fibers of about 2 microns in diameter and about 1/16 – ¼ inch in length. During blending of the furnish they became chopped up in random lengths. Mixtures containing about 50–90 weight percent macro fibers and 10–50 weight percent micro fibers have given good results.

If the filter element is to be used to remove very small particles such as encountered in internal combustion engine exhaust it is preferred that the glass fiber constituent of the mat contains a greater proportion of glass micro fibers. Excellent exhaust gas filters can be made using a mixture of glass micro fibers and poly(m-phenylene isophthalamide) fibrids and short fibers. Preferably the glass micro fibers are in the 0.6–2 micron range, and more preferably in the 0.75–1.6 micron range. From about 5–70 weight per cent of the mat can be poly(m-phenylene isophthalamide) fibrids and short fibers and the balance glass micro fibers. More preferably, from about 10–50 weight per cent of the mat is poly(m-phenylene isophthalamide) fibrids and short fibers and the balance glass micro fibers having a diameter of about 0.75–1.6 microns.

Good results can be obtained using only the fibrids described in U.S. Pat. NO. 3,756,908 as the aromatic polyamide constituent.

Referring to FIG. 1, the filter element is seen to be a random non-woven mat of glass macro fibers 1, glass micro fibers 2, aromatic polyamide short fibers 3 and aromatic polyamide fibrids 4. Polyamide fibers 3 and 4 are bonded to both the glass macro fibers 1 and glass micro fibers 2 at each point of contact 5, thus binding the mat into a unitary flexible filter element of high strength.

A further embodiment of the invention is a method of making the filter element. This is accomplished by (a) forming an aqueous slurry of glass fibers and aromatic polyamide fibers, (b) filtering the aqueous slurry to form a non-woven mat, and (c) heating the non-woven mat to the softening temperature of the aromatic polyamide thereby causing the polyamide fibers to bond to the glass fibers. The filter element can be made on a Fourdrinier machine by depositing a web of glass fiber and aromatic polyamide fiber on the wire, drying and removing the web, and then heating the web for a short period (generally 5–30 seconds) to the softening temperature of the aromatic polyamide. With poly(m-phenylene isophthalamide) good results are obtained by heating the dried web or pad in an oven at about 420°–450°C. for 2–10 seconds.

Alternatively, useful filter elements can be prepared using a handsheet mold.

The filter element thickness is determined by the thickness of the web laid down on the wire. Filter porosity can be varied by varying the amount of glass micro fibers used in the filter. This is illustrated by the following examples.

EXAMPLES 1 – 12

A series of filter elements was made from an aqueous slurry of glass macro fibers (8 micron, 0.25 inch long), glass micro fibers (about 2 microns) and a mixture of poly(m-phenylene isophthalamide) fibrids and short fibers. The fibrids and short fibers were prepared by disintegrating a synthetic poly(m-phenylene isophthalamide) paper in a Waring blender. All the ingredients were then combined in the slurry and blended further.

The filter sheets were made from the furnish by filtering the furnish on a 150 mesh wire. The wet pad was couched with dry blotters, removed from the wire, and then oven dried. The resultant pad was heat-bonded by placing in an oven at 420°–450°C. for 2–10 seconds. The following table shows the proportion of components used in preparing the series of filter elements and the porosity of the filter in terms of cubic feet per minute (CFM) air flow at a pressure of 0.5 inches of water.

| Filter Element | glass macro fiber (8μ) | glass micro fiber (2μ) | poly(m-phenylene isophthalamide) fiber | Air flow CFM/sq. ft. at ½″ H₂O Pres. |
|---|---|---|---|---|
| 1 | 0.4 | 0.16 | 0.4 | 165 |
| 2 | 0.8 | 0.32 | 0.8 | 83 |
| 3 | 0.8 | 0.64 | 0.8 | 57 |
| 4 | 0.8 | 0.96 | 0.8 | 40 |
| 5 | 0.8 | 0.96 | 1.6 | 35 |
| 6 | 1.76 | 0.0 | 1.6 | 57 |
| 7 | 0.0 | 1.76 | 1.6 | 18 |
| 8 | 0.0 | 0.68 | 2.68 | 15 |
| 9 | 0.0 | 1.34 | 2.02 | 19 |
| 10 | 0.0 | 2.02 | 1.34 | 23 |
| 11 | 0.0 | 2.68 | 0.68 | 24 |
| 12 | 0.0 | 0.80[1] | 0.2 | 13 |
| 13 | 0.0 | 0.60[1] | 0.4 | 15 |

[1] 0.75–1.6 micron glass fiber

The filter elements are exceptionally strong. A series of filter sheets of the same weight (47 lbs/3000 ft²) and porosity (air flow 12 CFM/ft² at 0.5 inch H₂O pressure) was prepared as in the above examples from glass fibers and micro fibers and varying amounts of poly(m-phenylene isophthalamide) short fibers and fibrids. The resultant mat was fused in each case at 450°C. for 2 seconds. The following table shows the tensile strength of the resultant filter sheets.

| % poly(m-phenylene isophthalamide) | Tensile strength lbs/inch width |
|---|---|
| 0 | 0.75 |
| 30 | 1.1 |
| 40 | 2.7 |
| 50 | 4.6 |
| 60 | 6.8 |
| 70 | 9.1 |

A further embodiment of the invention is an exhaust system adapted to remove particulates from the exhaust gas of an internal combustion engine comprising a filtration housing having an inlet and an outlet, the inlet being operatively connected to receive the exhaust gas from an internal combustion engine, a passage within the housing from the inlet to the outlet and a filter element as previously described completely across the passage whereby the exhaust gas passing from the inlet to the outlet must pass through the filter element.

Figure 2:
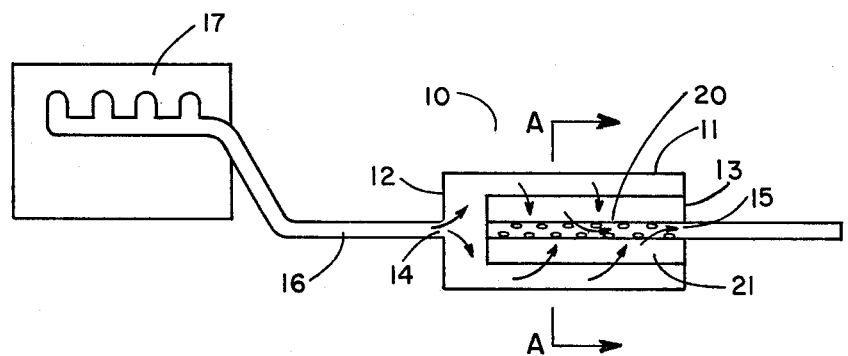
FIG. 2 is a schematic of an internal combustion engine exhaust system including a filter.
Figure 3:
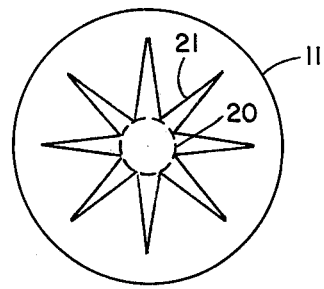
FIG. 3 is a cross-section taken at AA through the filter housing.

Such a system is shown in FIGS. 2 and 3. Filter housing 10 is constructed of cylindrical side wall 11 and end closures 12 and 13. Inlet 14 is centrally located in end closure 12 and outlet 15 in end closure 13. Exhaust pipe 16 connects inlet 14 to the exhaust outlet of internal combustion engine 17.

Extending axially through outlet 15 into filter housing 10 is tube 20 which is perforated inside housing 10. Pleated filter element 21 fits snugly around tube 20.

In operation, exhaust gas from engine 17 is conducted by exhaust pipe 16 to inlet 14 of filter housing 10. After entering housing 10, the exhaust gas is forced to pass through filter element 21 in order to enter perforated tube 20 from where the cleaned exhaust exits through outlet 15 and is exhausted to the atmosphere.

It is preferred to place a cyclone trap in the exhaust system between the engine and the filter to remove the coarse particulates and only use the filter to remove particulates in the micron range which might pass through the trap.

I claim:

1. A filter element of high strength and good flex useful in filtration of particulates from gas at elevated temperatures, said filter element comprising a non-woven mat of glass fibers and aromatic polyamide fibers, said aromatic polyamide fibers being fused to said glass fibers, said aromatic polyamide fibers being a mixture of fibrids and short fibers of poly(m-phenylene isophthalamide).

2. A filter element of claim 1 wherein said glass fiber is a glass micro fiber having a diameter of about 0.6-2 microns and said poly(m-phenylene isophthalamide) fiber is a mixture of fibrids and short fibers.

3. A filter element of claim 2 wherein from about 5-70 weight percent of said mat is said poly(m-phenylene isophthalamide) fiber.

4. A filter element of claim 3 wherein about 10-50 weight percent of said mat is said poly(m-phenylene isophthalamide) fiber.

5. A filter element of claim 1 wherein said glass fiber is a mixture of glass micro fibers having a diameter of 6-10 microns and glass micro fibers having a diameter of 1-3 microns.

6. A filter element of claim 5 wherein about 50-90 per cent of said glass fibers are said macro fibers and about 10-50 percent of said glass fibers are said micro fibers.

7. An exhaust system adapted to remove particulates from the exhaust gas of an internal combustion engine, said system comprising a filtration housing having an inlet and an outlet, said inlet being operatively connected to receive the exhaust gas from said internal combustion engine, a passage within said housing from said inlet to said outlet and a filter element of claim 1 completely across said passage whereby said exhaust gas passing from said inlet to said outlet passes through said filter element.

* * * * *

UNITED STATES PATENT AND TRADEMARK OFFICE
CERTIFICATE OF CORRECTION

PATENT NO. : 3,920,428
DATED : November 18, 1975
INVENTOR(S) : Homan B. Kinsley, Jr.

It is certified that error appears in the above-identified patent and that said Letters Patent are hereby corrected as shown below:

Column 6, in Claim 5, line 2, "glass micro fibers" should read -- glass macro fibers --

Signed and Sealed this twenty-fourth Day of February 1976

[SEAL]

Attest:

RUTH C. MASON
Attesting Officer

C. MARSHALL DANN
Commissioner of Patents and Trademarks